(12) United States Patent
Fryxell et al.

(10) Patent No.: US 6,723,426 B2
(45) Date of Patent: Apr. 20, 2004

(54) COMPOSITE MATERIAL AND METHOD OF MAKING

(75) Inventors: Glen E. Fryxell, Kennewick, WA (US); William D. Samuels, Richland, WA (US); Kevin L. Simmons, Kennewick, WA (US)

(73) Assignee: Battelle Memorial Institute

( * ) Notice: Subject to any disclaimer, the term of this patent is extended or adjusted under 35 U.S.C. 154(b) by 209 days.

(21) Appl. No.: 09/796,002

(22) Filed: Feb. 27, 2001

(65) Prior Publication Data

US 2001/0008697 A1 Jul. 19, 2001

Related U.S. Application Data

(63) Continuation-in-part of application No. 09/272,750, filed on Mar. 17, 1999, now abandoned.

(51) Int. Cl.[7] .............. B32B 13/12; B32B 9/04
(52) U.S. Cl. ............ 428/333; 428/447; 428/451; 427/387; 156/272.6
(58) Field of Search .................. 428/36.7, 446, 428/333, 447, 405, 451, 357; 427/131, 132, 387, 409, 458, 470, 489, 447, 491, 539, 540, 526, 577; 156/150, 151, 272.6, 273.3; 118/723 E

(56) References Cited

U.S. PATENT DOCUMENTS

| | | | | |
|---|---|---|---|---|
| 4,906,695 A | * | 3/1990 | Blizzard et al. | 427/387 |
| 5,645,939 A | * | 7/1997 | Yoneda et al. | 428/447 |
| 6,030,656 A | * | 2/2000 | Hostettler et al. | 427/409 |
| 6,284,365 B1 | * | 9/2001 | Hirose et al. | 428/405 |
| 6,472,080 B1 | * | 10/2002 | Inagaki et al. | 428/447 |

* cited by examiner

Primary Examiner—Stevan A. Resan
Assistant Examiner—Louis Falasco
(74) Attorney, Agent, or Firm—Stephen R. May; Douglas E. McKinley, Jr.

(57) ABSTRACT

The composite material and methods of making the present invention rely upon a fully dense monolayer of molecules attached to an oxygenated surface at one end, and an organic terminal group at the other end, which is in turn bonded to a polymer. Thus, the composite material is a second material chemically bonded to a polymer with fully dense monolayer there between.

15 Claims, 2 Drawing Sheets

COMPOSITE MATERIAL AND METHOD OF MAKING

RELATED APPLICATION

This application is a continuation in part of U.S. patent application Ser. No. 09/272,750, filed Mar. 17, 1999, now abandoned.

This invention was made with Government support under Contract DE-AC0676RLO1830 awarded by the U.S. Department of Energy. The Government has certain rights in the invention.

FIELD OF THE INVENTION

The present invention is a composite material and method of making the same. More specifically, the present invention relies upon the use of a self assembling, fully dense monolayer as a chemical bond between a first material and a polymer.

Nearly all materials may be considered composite materials because most materials are made up of dissimilar elements, even to the molecular level. However, as used herein, a "composite material" is a combination of dissimilar solid bulk materials, specifically a combination of a material having an oxygenated surface, a fully dense monolayer, and a polymer.

Oxygenated includes oxide, hydroxide, hydrated oxide and combinations thereof.

BACKGROUND OF THE INVENTION

The market for composite material totaled nearly 1.2 million tons in 1991. It is estimated to reach 3.7 million tons by the year 2000. The use of composite material is driven by the desire to decrease part weight and/or increase the factor of safety in a design. Helmets, lightweight structural elements for vehicles, and many other products benefit from the use of composite materials. The continuing challenge for designers of composite materials is to maintain structural strength, increase dynamic strength, and decrease weight.

In many applications, the desired composite material is a polymer combined with a second material. The polymer may be in the form of a slab or sheet that is combined with another slab or sheet of the second material. The slabs or sheets may include solid or monolithic slabs or sheets, as well as woven or networked structures. Another common form is a polymer mixed with a filler wherein the filler is the second material. This form of composite material may be described as the filler having a plurality of particles with the polymer substantially surrounding each of the plurality of particles, and the polymer is bonded or interfacially adhered to each of the plurality of particles. Particles are available in various geometric forms including particulate, fiber, rod, and combinations thereof. In either case, the bond between the polymer and the second material is characterized as a mechanical strength limitation of the composite material.

Composite materials of this type are generally made by contacting the polymer with the second material so that the polymer bonds to the second material. Most often, the second material is a filler of a plurality of particles substantially surrounded by the polymer.

It is well known that these types of composite materials fail well below their theoretical strength. Failure mechanisms of composite materials are complex, but delamination, or separation of composite elements, is a major cause of structural failure of these types of composite materials. Delamination may be characterized by incomplete wetting of the filler (usually a fiber) by the polymer resin. In addition, even in well-wetted areas, there can be poor interfacial adhesion between the filler and the polymer resin. The poor bond between filler and polymer or poor interfacial adhesion is characterized as a mechanical strength limitation of the composite materials. For example, double paned windows lose the seal between the panes as a result of loss of bond integrity between the glass pane and the plastic frame structure. Fiberglass loses strength when the glass fibers separate from the polymer.

Efforts to overcome this mechanical strength limitation have resulted in placing a bond coating on the second material. Such bond coatings are usually a layer of a low molecular weight organic polymer, or organosilane coupling agents, for example phenol-formaldehyde resins or 3-glycidoxypropyltrimethoxysilane, 3-methacryloxypropyltrimethoxysilane, or -aminopropyltriethoxysilane. However, even with these bond coatings, the strength of the interfacial bond is far less than theoretical strength.

U.S. Pat. No. 5,759,708 to Tarasevich and Rieke shows a composite material of an organic substrate that is modified (surface modified by addition of acidic, basic or neutral group) by addition of a functional group, followed by solution deposition of a second material of an inorganic material that can be a ceramic material. A disadvantage of this method is that bulk forms (e.g. slab or particle) of both substrate and second material cannot be bonded together. In other words, the method of Tarasevich and Rieke cannot be applied to making a composite material of a filler in a polymer.

Thus, there remains a need for a composite material that is a combination of bulk forms, and method of making such a composite material that has greater mechanical strength as a result of improved interfacial adhesion between the polymer and the other material.

SUMMARY OF THE INVENTION

The composite material and methods of making of the present invention rely upon a fully dense monolayer of molecules of at least 1.5 molecules per square nanometer. The molecules of the fully dense monolayer further have a carbon chain spacer having a first end and a second end, the first end bonded to an oxygenated surface of a first material, and the second end bonded to an organic terminal group that is in turn bonded to a polymer.

It is an object of the present invention to provide a composite material with enhanced mechanical strength.

It is another object of the present invention to provide a method of making a composite material with enhanced mechanical strength.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

DESCRIPTION OF THE PREFERRED EMBODIMENT(S)

Figure 1:
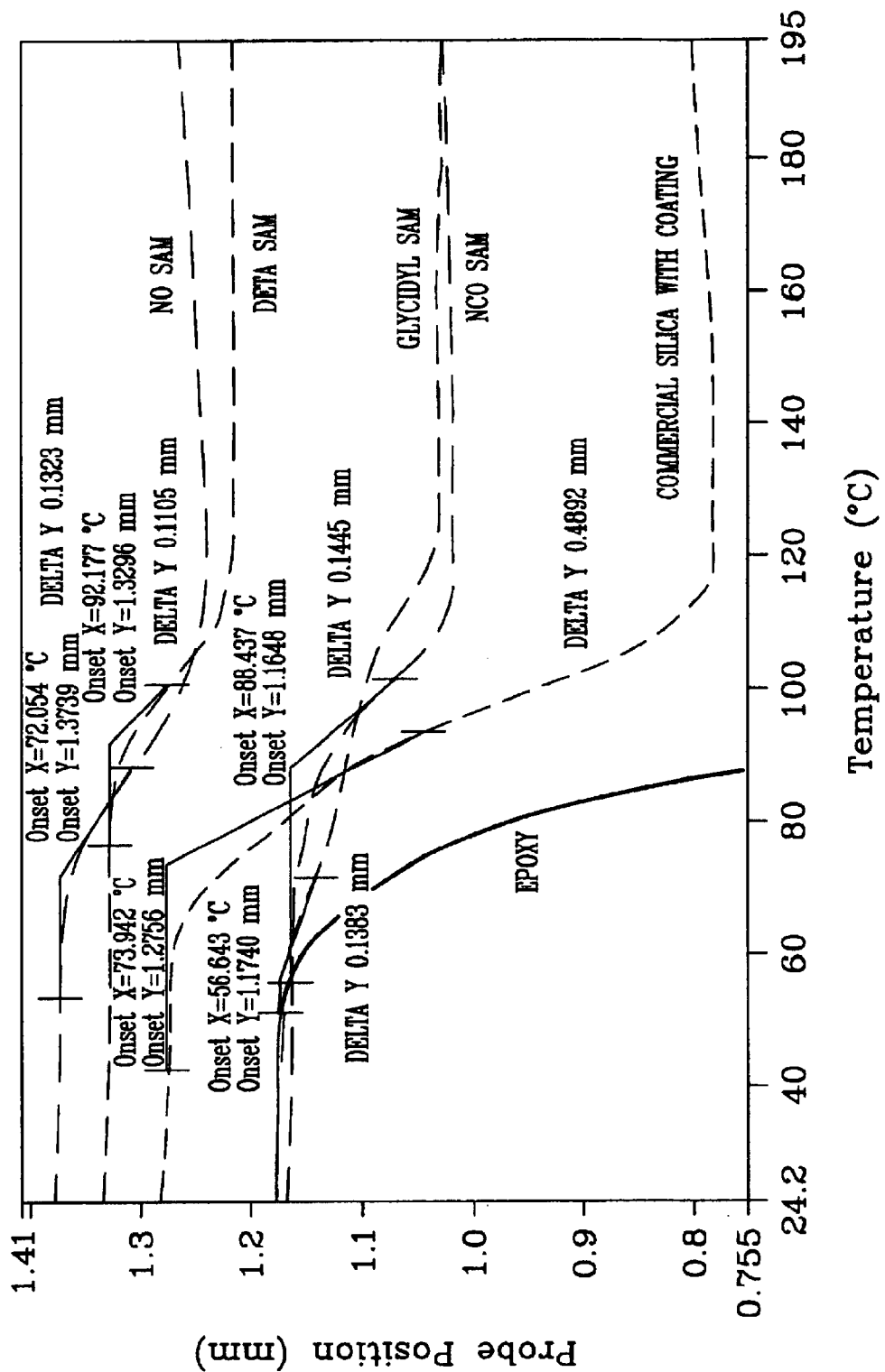
FIG. 1 is a graph of modulus for various materials.

A composite material according to the present invention is a material having an oxygenated surface bonded to a polymer with a fully dense monolayer. The present invention relies upon bonding the polymer to the material having an oxygenated surface with a fully dense monolayer made of molecules having a first end that attaches or bonds to an oxygenated surface and a second end that bonds to the polymer. The fully dense monolayers of the present invention are distinct from prior art methods of bonding polymers with other materials because the method of the present invention provides far greater density of the molecules forming the bond there between. This is accomplished by thoroughly cleaning and appropriately hydrating the oxygenated surface and pre-treating it with a coupling agent. In this manner, the molecules may be added to the surface, whereupon they form into a fully dense self assembled monolayer. These monolayers are characterized by surface coverages having at least 1.5 molecules per square nanometer and preferably at least 3.0 molecules per square nanometer. Thusly formed, the terminal groups of the monolayer are then bonded to the polymer, thereby forming a bond between the polymer and the oxygenated surface having a maximum density of molecules bonding the polymer to the oxygenated surface.

The molecules of the fully dense monolayer have a carbon chain spacer having a first end and a second end. The first end is bonded to material having an oxygenated surface, and the second end bonded to an organic terminal group that is in turn bonded to the polymer. The monolayer thus provides a dense materials chemically bonded on one end to the oxygenated surface and on the other end to the polymer, which is characterized as a mechanical strength enhancement of the composite material.

The polymer may be thermoset, thermoplastic, elastomeric and combinations thereof. Suitable polymers include, but are not limited to, a carbon chain with hydrogen and/or oxygen attached thereto (preferred); a carbon chain with a heteroatom as part of the carbon chain (backbone), for example Nylon, epoxy, polyethylene terephthalate, polyetherimide; an inorganic polymer, for example polyphosphazene; and combinations thereof.

Suitable materials having an oxygenated surfaces include but are not limited to silicon; carbon for example graphite, carbon fiber; metal for example iron, nickel, tin, alumnium, zirconium, germanium; metal oxide for example aluminum oxide, germanium oxide, zirconium oxide, tin oxide, oxide of titanium including titanium oxide, titanates, rutile, anatase, brookite; silaceous oxide for example glass, silica, diatomaceous earth, quartz, feldspar, kaolin; and combinations thereof. The material having an oxygenated surface may have any geometric shape, but is commonly either in the form of particles as a filler (e.g. flakes, fibers, whiskers or spheres), or as a monolith, slab or sheet, like a glass microscope slide or a continuous network. It will be appreciated by those of skill in the art that many other geometric forms of the material having an oxygenated surface are possible.

Bonding or attaching the first end of the molecules of the fully dense monolayer (e.g. silane) to the oxygenated surface is generally achieved by covalently bonding a silane coupling agent to the oxygenated surface via hydrolysis and condensation reactions. The silane coupling agent contains the carbon spacer and the terminal functional group.

Bonding or attaching the polymer to the functional group is done by establishing a covalent link between the terminal functional group and the polymer. This is preferably done with nucleophilic addition of free radical addition. Alternatively, bonding includes but is not limited to electrophilic addition, cycloaddition, nucleophilic displacement, condensation, free radical initiation, thermal re-arrangement, and combinations thereof.

The material having an oxygenated surface may have an oxygenated surface by virtue of inherent presence of oxygen in the second material as in the case of oxides as recited above. For materials having substantially no inherent presence of oxygen, for example carbon, it is necessary to provide an oxygenating step so that a surface of the second material is oxygenated.

Methods of surface oxygenation (introducing or adding oxygen to the surface) may vary depending upon the material. Surface oxygenation may be done with plasma fields created with a gas (air the most common) for certain types of surfaces, especially polymer, carbon and combinations thereof. Surface oxygenation of the surface may also be accomplished via chemical oxidative processes. Alternatively, a caustic solution may be used to activate oxygenated surfaces (e.g. transform or convert siloxane to silanol, or oxide to hydroxyl), especially for silica surfaces. Electrochemical treatment may also serve to oxygenate a surface, especially metal, carbon and combinations thereof.

The molecules of the fully dense monolayer of the present invention each have an oxygen attaching end that attaches to an oxygen atom on an oxygenated surface of the material. Each assembly molecule further has a carbon chain spacer having a first end and a second end, the first end bonded to the material having an oxygenated surface, and the second end bonded to an organic terminal group that is bonded to the polymer.

Suitable molecules for forming the fully dense monolayer include, but are not limited to, NCO (3-isocyanatopropyltrimethpoxysilane), glycidyl (2-epoxypropyloxy)-3-propyl trimethoxysilane), ECH (3-('3, '4-Epoxycyclohexyloxy)-3-propyltrimethoxysilane), APS (3-Aminopropyltrimethoxysilane), DETA (Diethylenetriamine propyltrimethoxysilane), OTS (Octadecyl trichloroysilane), TFEE (trifluoroethyl ester of 11-trichlorosilyl undecanoic acid), TTS (Tetradecyl trichlorosilane), AEAP ((2-aminoethyl)-3-aminopropyltrimethoxysilane), MPS (3-mercaptopropyltrimethoxysilane) and combinations thereof.

The first end of the molecules forming the fully dense monolayer are a silane, including but not limited to chlorosilane, siloxane, silazane and combinations thereof.

The carbon chain spacer may have any number of carbon atoms from 1 to about 20 carbon atoms, preferably from about 5 to about 15 carbon atoms.

The organic terminal group is a functionally reactive group including but not limited to terminal alkenes, alkynes, epoxides, alcohols, amines, aldehydes, ketones, esters, amides, thiols, isocyanates, acrylates, styrenes and combinations thereof.

EXAMPLE 1

An experiment was conducted to demonstrate the mechanical strength improvement of the polymer to particle bond of the present invention.

Sample composite materials were made with the polymer of epoxy (specifically REFCOA 504 obtained from Composite Materials Incorporated, Arlington, Wash., a curing agent (specifically diethylenetriamine obtained from Sigma Aldrich Corporation, Milwaukee, Wis.), and the filler of high surface area diatomaceous earth (specifically Celite, Sigma Aldrich Corporation, Milwaukee, Wis.). The ratio of filler to polymer was 25% by weight. The diatomaceous earth was coated with four molecules for forming a fully dense monolayer that mixed well in the epoxy, ECH, NCO, APS, Glycidyl, and DETA.

Dynamic Mechanical Analysis (DMA) was used to determine changes in storage modulus and glass transition temperatures. The DMA test was conducted under a constant stress and a scanned temperature range from 25° C. to 190°

C. All mechanical loading on the composite material samples were equal and the only variable was the type of coating applied to the surface. The ability of the Celite® material coated with molecules forming a fully dense monolayer to mix into the epoxy determined which molecules are more receptive to the epoxy matrix.

Mechanical Analysis (DMA) (FIG. 1) shows the effect of temperature changes on the modulus. The modulus is a direct function of the cross-linking density which is a function of the type of organic terminal group which may affect the strength or extent of bonding between the oxygenated surface of the material (e.g. filler) to the polymer. As indicated by the curves in FIG. 1, the glass transition temperature shifts based on the extent of cross-linking. The heat deflection temperature is related to the glass transition temperature and if the glass transition temperature shifts up the heat deflection temperature.

A change in the height of the modulus from the initial through the transition stages indicates increases or decreases in cross-linking. The probe deflection curve shows how much deflection the sample undergoes during heat-up. When one sample is able to resist deflection compared to another, it indicates a higher heat deflection temperature.

Figure 2:
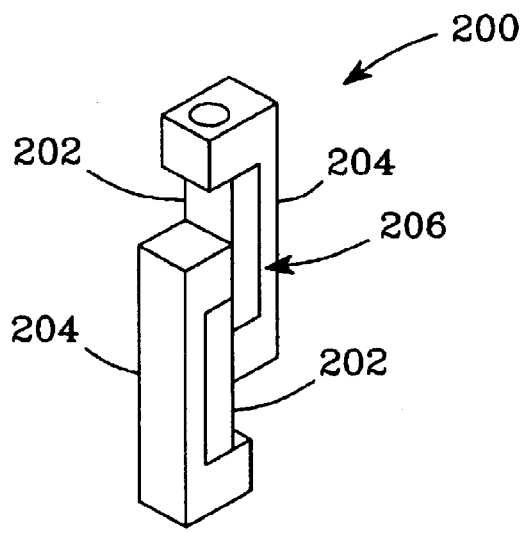
FIG. 2 is a modified lapshear fixture.

A lapshear test was also done on composite material specimens. The fully dense monolayer adhesion strength required modifying the lapshear fixture and slide specimen fabrication to significantly reduce the adhesive area. FIG. 2 shows the fixture 200 that was needed to keep the glass slides 202 from to flexing and peeling. Standard specimen clamps caused failure of the glass slides. Two 1" thick steel C-shaped pieces 204 were fabricated to constrain the lapshear specimens from peeling when the load is applied. The loading on the specimens was from the overlapped ends 206 that were ¼" thick plate glass with a ½" and ¼" overlaps. Normal lapshear specimens that are less brittle are typically loaded from the ends away from the overlap and the overlap area is usually 1". However, due to high loadings on the glass, alternative configurations needed to be used for determining this overlap adhesive strength.

Figure 3:
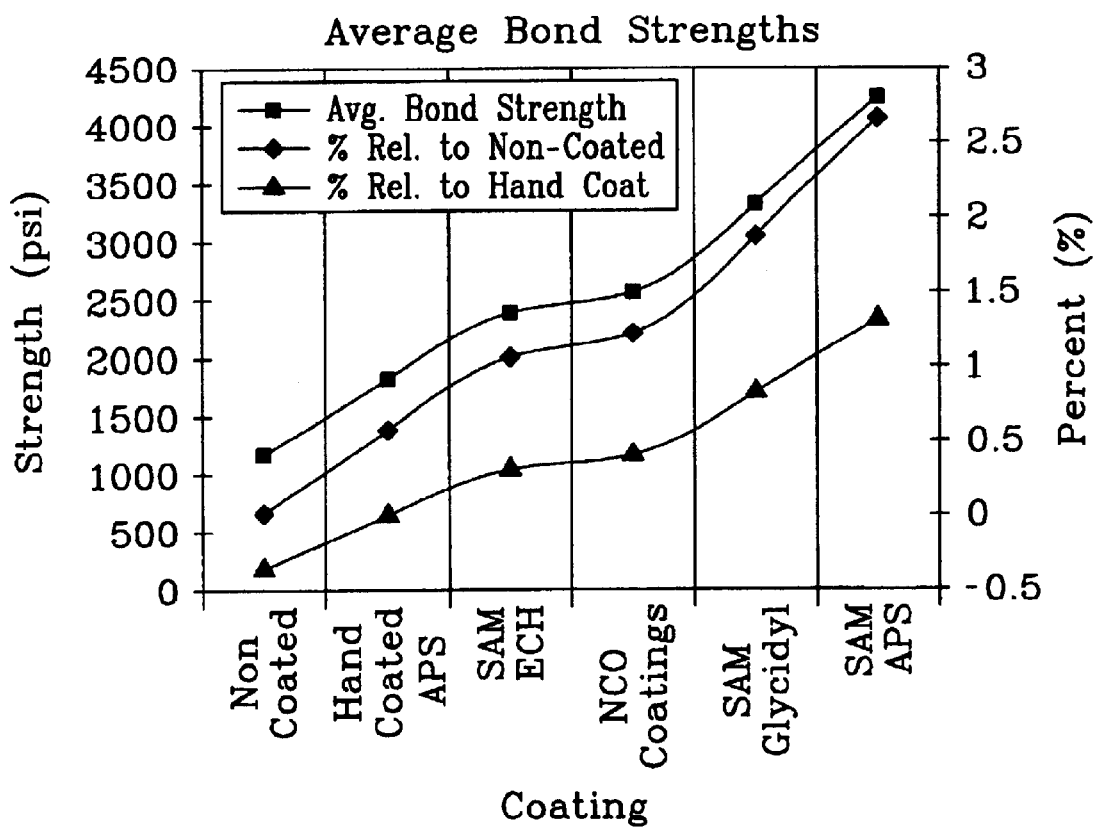
FIG. 3 is a graph of strength for various coatings.

The results in FIG. 3 show the fully dense monolayer outperforming a direct wiped on coating of silane coupling agent to the surface. This demonstrates that ordered surface attachments can improve the adhesion between glass substrates. As shown in the FIG. 3, the fully dense monolayer APS outperformed all other fully dense monolayers. However, the other fully dense monolayers offer different types of bonding, such as, energy absorption or chemical resistance.

The preliminary results showed that fully dense monolayers could improve the adhesion between two glass substrates. The increase that was seen is due in part to an increase in the number of attachment sites from the glass to the matrix.

CLOSURE

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:

1. A composite material, having
a first material having an oxygenated surface;
said oxygenated surface bonded to a first end of molecules having a carbon chain spacer forming a fully dense monolayer of at least 1.5 molecules per square nanometer and
a second end of said molecule having organic terminal groups and said organic terminal groups bonded to a polymer as a second material.

2. The composite material as recited in claim 1, wherein said polymer is selected from one or more of the group consisting of thermoset, thermoplastic and elastomeric.

3. The composite material as recited in claim 1, wherein said first material is selected from the group consisting of inorganic material.

4. The composite material as recited in claim 3, wherein said inorganic material is selected from one or more of the group consisting of silicon, boron nitride, carbon, metal, metal oxide and silaceous oxide.

5. The composite material as recited in claim 4, wherein said inorganic material is carbon selected from one or more of the group consisting of graphite, carbon fiber and diamond.

6. The composite material as recited in claim 4, wherein said metal is selected from one or more of the group consisting of iron, nickel, tin, aluminum, zirconium and germanium.

7. The composite material as recited in claim 4, wherein said inorganic material is metal oxide selected from one or more of the group consisting of aluminum oxide, germanium oxide, zirconium oxide, tin oxide and oxides of titanium.

8. The composite material as recited in claim 7, wherein said oxide of titanium is selected from one or more of the group consisting of titanium oxide, titanates, rutile, anatase and brookite.

9. The composite material as recited in claim 4, wherein said silaceous oxide is selected from one or more of the group consisting of glass, silica, diatomaceous earth, quartz, feldspar and kaolin.

10. The composite material as recited in claim 1, wherein said molecules of said fully dense monolayer are selected from one or more of the group consisting of NCO (3-isocyanatopropyltrimethoxysilane), glycidyl (2-epoxypropyloxy)-3-propyltrimethoxysilane), ECH (3-('3, '4-Epoxycyclohexyloxy)-3-propyltrimethoxysilane), APS (3-Aminopropyltrimethoxysilane), DETA (Diethylenetriamine propyltrimethoxysilane), OTS (Octadecyl trichlorosilane), TFEE (trifluoroethyl ester of 11-trichlorosilyl undecanoic acid), TTS (Tetradecyl trichlorosilane), AEAP ((2-aminoethyl) aminopropyltrimethoxysilane) and MPS (3-mercaptopropyltrimethoxysilane).

11. The composite material as recited in claim 1 wherein said first end bonded to said oxygenated surface is a silane.

12. The composite material as recited in claim 1, wherein said carbon chain spacer has from 1 to about 20 carbon atoms.

13. The composite material as recited in claim 12, wherein said carbon chain spacer has from about 5 to about 15 carbon atoms.

14. The composite material as recited in claim 1, wherein said organic terminal group is selected from one or more of the group consisting of terminal alkenes, alkynes, epoxides, alcohols, amines, aldehydes, ketones, esters, amides, thiols, isocyanates, acrylates and styrenes.

15. The composite material as recited in claim 1, wherein said polymer substantially surrounds said second material and said fully dense monolayer forms a bond between said first material and said polymer.

* * * * *